United States Patent
Yamaji et al.

(10) Patent No.: US 11,834,575 B2
(45) Date of Patent: Dec. 5, 2023

(54) EPOXY RESIN COMPOSITION

(71) Applicant: CANON KABUSHIKI KAISHA, Tokyo (JP)

(72) Inventors: Haruka Yamaji, Tokyo (JP); Yasushi Iijima, Tokyo (JP); Isao Imamura, Kanagawa (JP); Sachiko Yamauchi, Kanagawa (JP); Hiroki Kihara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 176 days.

(21) Appl. No.: 17/144,390

(22) Filed: Jan. 8, 2021

(65) Prior Publication Data
US 2021/0222000 A1    Jul. 22, 2021

(30) Foreign Application Priority Data
Jan. 17, 2020   (JP) .............................. 2020-005946

(51) Int. Cl.
| | |
|---|---|
| *C08L 63/00* | (2006.01) |
| *B41J 2/135* | (2006.01) |
| *C08K 5/08* | (2006.01) |
| *C08K 3/36* | (2006.01) |

(52) U.S. Cl.
CPC .............. *C08L 63/00* (2013.01); *B41J 2/135* (2013.01); *C08K 5/08* (2013.01); *C08K 3/36* (2013.01)

(58) Field of Classification Search
CPC . C08L 63/00; B41J 2/135; C08K 5/08; C08K 3/36
USPC ............................................................ 347/20
See application file for complete search history.

(56) References Cited

U.S. PATENT DOCUMENTS

| | | | |
|---|---|---|---|
| 7,931,352 B2 | 4/2011 | Imamura et al. | |
| 9,018,321 B2 | 4/2015 | Amano et al. | |
| 2014/0329926 A1* | 11/2014 | Kirino ............... | C08G 59/66 |
| | | | 522/66 |

FOREIGN PATENT DOCUMENTS

| | | |
|---|---|---|
| JP | 2006-312312 A | 11/2006 |
| JP | 2007-077382 A | 3/2007 |
| JP | 2014-133875 A | 7/2014 |
| JP | 2015-117262 A | 6/2015 |
| JP | 2015-221900 A | 12/2015 |
| JP | 2017-088825 A | 5/2017 |
| WO | WO-2018173991 A1 * | 9/2018 ............. C08G 59/66 |

OTHER PUBLICATIONS

Abe, WO 2018/173991 A1 machine translation in English, Sep. 27, 2018 (Year: 2018).*
Imamura et al., U.S. Appl. No. 17/143,349, filed Jan. 7, 2021.
Notice of Reasons for Refusal in Japanese Application No. 2020-005946 (dated Oct. 2023).

* cited by examiner

*Primary Examiner* — David T Karst
(74) *Attorney, Agent, or Firm* — VENABLE LLP

(57) ABSTRACT

There is provided an epoxy resin composition including: an epoxy resin, a thixotropic agent, a photobase generator, and an ether skeleton polythiol.

17 Claims, 2 Drawing Sheets

EPOXY RESIN COMPOSITION

BACKGROUND OF THE INVENTION

Field of the Invention

The present invention relates to an epoxy resin composition useful as an adhesive. In addition, the present invention also relates to a liquid ejection head using the composition as an adhesive.

Description of the Related Art

An epoxy-based resin composition is widely used as adhesive since the composition has high adhesiveness and high chemical resistance. In particular, for joining a precision part including a liquid ejection head represented by an inkjet head, ink resistance and curability in a short time are required in order to prevent the part from being displaced during assembly. In addition, in view of applying an adhesive to a fine portion, a one-pack type adhesive is preferable.

A representative example of the adhesive having such characteristics include a photocationic polymerization type epoxy resin adhesive. This adhesive has a long pot life as one pack and is cured by UV irradiation for several seconds and heating for several seconds, and thus is industrially preferably used. For example, after applying an adhesive to an adherend, UV irradiation is performed to laminate the adherend and cure the adherend by heating at 100° C. for several seconds, and thus displacement is hardly likely to occur and holding the work for a long time is not required. Therefore, the process can be proceeded quickly to a subsequent process.

Since an ether bond is formed by opening of an epoxy ring, the photocationic polymerization type epoxy resin is excellent in chemical resistance. However, as the ether bond is formed, the number of functional groups that contribute to adhesion such as hydroxyl groups decreases, and the adhesiveness may not be sufficient. On the other hand, with an emphasis on adhesiveness, a photoanionic polymerization type epoxy resin using a reaction initiated by a base is known. Although the photoanionic polymerization type epoxy resin has excellent adhesiveness, the photoanionic polymerization type epoxy resin requires a long time for polymerization and does not have temporary fixing property. This is because the base generated by a photobase generator in the photoanionic polymerization type does not have strong basicity compared to an acid generated by a photoacid generator in the photocationic polymerization type, and the photoanionic polymerization has lower reaction rate compared to the photocationic polymerization.

Among the photoanionic polymerizations of an epoxy resin, examples having a high reaction rate include thiol curing using polythiol as a curing agent. Polythiol reacts with the epoxy resin at a high speed in the presence of a basic catalyst or cure accelerator. As an adhesive for enhancing temporary fixing property using the thiol curing, Japanese Patent Application Laid-Open No. 2007-77382 is known. Japanese Patent Application Laid-Open No. 2007-77382 relates to an adhesive composition containing an epoxy resin, a thiol compound having one or more ester bonds in the molecule, and a photobase generator that generates a base by light irradiation. A basic substance generated from the photobase generator by light irradiation accelerates curing reaction by a thiol compound of the epoxy resin, thereby improving the temporary fixing property.

SUMMARY OF THE INVENTION

The present invention is an epoxy resin composition containing an epoxy resin, a thixotropic agent, a photobase generator, and an ether skeleton polythiol.

Further features of the present invention will become apparent from the following description of exemplary embodiments with reference to the attached drawings.

DESCRIPTION OF THE EMBODIMENTS

Figure 1:
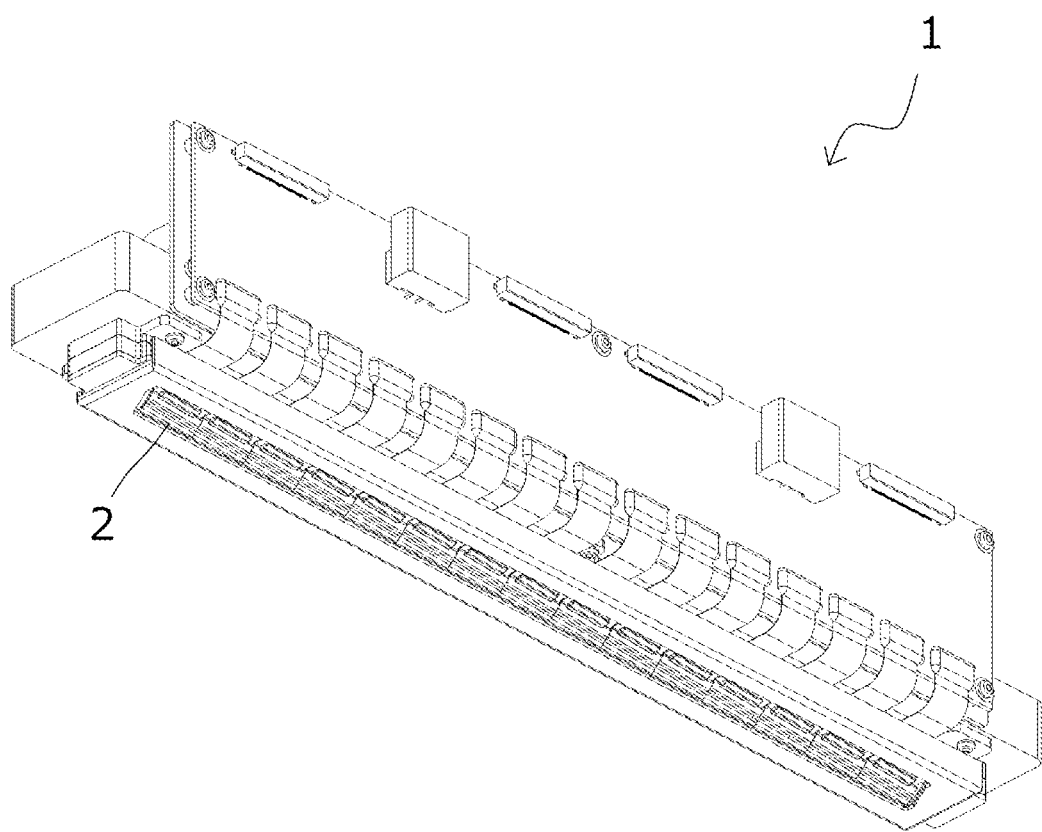
FIG. 1 is a perspective view of an inkjet head.

The adhesive composition according to Japanese Patent Application Laid-Open No. 2007-77382 also has a problem that the reaction rate is lower than that of the photocationic polymerization, and it requires time for temporary fixation of a part. In addition, the photobase generator gradually decomposes in a room temperature environment even without UV irradiation. Since the curing reaction gradually proceeds using the base generated by decomposition as a catalyst, there is also a problem that the pot life is short.

Therefore, an object of the present invention is to provide an epoxy resin composition which has a sufficient pot life as one pack and is excellent in temporary fixing property and adhesiveness.

The present invention is an epoxy resin composition containing at least an epoxy resin, a thixotropic agent, a photobase generator, and an ether skeleton polythiol. In addition, the resin composition may optionally contain a sensitizer and/or a silane coupling agent.

According to the present configuration, by irradiating the epoxy resin composition (adhesive) with light, in a case where a sensitizer is contained, the sensitivity of a long wavelength region is improved by the sensitizer, and thereby a basic substance is generated from the photobase generator. The generated basic substance remarkably accelerates the curing reaction of the epoxy resin by the ether skeleton polythiol. Since the ether skeleton polythiol has higher reactivity than the ester skeleton polythiol, gelation proceeds in a short time, and the temporary fixing property can be improved. This is because mercaptide ions are generated from the ether skeleton polythiol which is a curing agent in the presence of the generated basic substance, and the mercaptide ions react with the epoxy resin at a high speed. This fast reaction is due to the remarkably high relative nucleophilic reaction rate of mercaptide ions. In addition, since it is a photoanionic polymerization, the epoxy resin composition is an adhesive having remarkably high adhesiveness. Furthermore, the addition of a thixotropic agent causes thixotropy to be expressed, and the movement of molecules can be suppressed. Therefore, it is possible to suppress the progress of the curing reaction by a base generated by separation from the photobase generator in a room temperature environment, and it is possible to express a sufficient pot life.

Hereinafter, constituent components of the epoxy resin composition (hereinafter, referred to as an adhesive) will be described.

(Epoxy Resin)

As the epoxy resin as a main agent, a known epoxy resin in the related art suitable for adhesive use can be used without limitation. Examples of the epoxy resin include aromatic (bisphenol type) epoxy resins such as bisphenol A type epoxy resin, bisphenol F type epoxy resin, and bisphenol AD type epoxy resin, and compounds obtained by further adding alkylene oxide to these. In addition, examples thereof include glycidyl ether type epoxy resins such as glycidyl ether, epoxy novolac resin, bisphenol A type novolac diglycidyl ether, and bisphenol F type novolac diglycidyl ether, glycidyl amine type epoxy resin, alicyclic epoxy, and the like. Further, in addition to the liquid epoxy resin, a solid one at room temperature alone can be also used as long as the solid one becomes liquid as an epoxy resin component in the adhesive composition. Examples of the solid epoxy resin at room temperature alone include an epoxy resin having a biphenyl skeleton, a naphthalene skeleton, a cresol novolac skeleton, a trisphenolmethane skeleton, a dicyclopentadiene skeleton, a phenol biphenylene skeleton, and the like.

(Curing Agent)

The adhesive of the present invention contains an ether skeleton polythiol as a curing agent. The ether skeleton polythiol generates mercaptide ions in the presence of a basic substance, and the mercaptide ions react with an epoxy group. Under the reaction, the reactivity of the ether skeleton polythiol curing agent is higher than that of the ester skeleton polythiol curing agent. Examples of the ether skeleton polythiol curing agent include pentaerythritol tripropanethiol (PEPT), trimethylolpropane dipropanethiol (TMPT), and pentaerythritol tetrapropanethiol (PETT), and the like. These can be obtained as commercially available products from SC Organic Chemical Co., Ltd. It is preferable that an amount of ether skeleton polythiol is equal to or more than 60 parts by mass with respect to 100 parts by mass of the epoxy resin. If the amount of polythiol is smaller than that of the epoxy resin, the reaction of the entire system may be slowed down and improvement in temporary fixing property may not be expected. In addition, in a case where the adhesive of the present invention is used for a liquid ejection head represented by the inkjet head, the ether skeleton polythiol preferably has 60 to 72 thiol equivalents with respect to 100 equivalents of epoxy of the epoxy resin. If the amount of polythiol is smaller than that of the epoxy resin, improvement in the temporary fixing property as described above may not be expected. On the other hand, if the amount of polythiol increases with respect to the epoxy resin, the amount of unreacted polythiol increases. As the unreacted polythiol is eluted into the ink, the polythiol is easily swollen with respect to the ink, and the liquid contact property may be lowered.

(Photobase Generator)

The photobase generator is not particularly limited, but examples of the photobase generator capable of generating a strong base include 1,2-dicyclohexyl-4,4,5,5-tetramethyl-biguanidium n-butyltriphenylborate or (Z)-{[bis(dimethylamino) methylidene] amino}-N-cyclohexyl(cyclohexylamino) methaneiminium tetrakis(3-fluorophenyl) borate and the like. Examples of the product name include WPBG-300 and WPBG-345 (manufactured by Fujifilm Wako Pure Chemical Industries, Ltd.). These alone have sensitivity to UV light having an extremely short wavelength, but when used in combination with a sensitizer, the sensitivity can be improved to a long wavelength side in the vicinity of 400 nm. The content of the photobase generator can be in a range of 1 to 20 parts by mass with respect to 100 parts by mass of the epoxy resin, but is preferably 3 to 15 parts by mass. If the content of the photobase generator is equal to or more than 1 part by mass with respect to 100 parts by mass of the epoxy resin, the reaction of the entire system is not delayed, and improvement in the temporary fixing property is expected. On the other hand, if the content of the photobase generator is equal to or less than 20 parts by mass with respect to 100 parts by mass of the epoxy resin, the amount of the base generated by decomposition of the photobase generator in a room temperature environment is sufficiently small, and the sufficient pot life is expected.

(Thixotropic Agent)

The adhesive of the present invention contains a thixotropic agent. Among them, as a thixotropic agent that suppresses the motility of molecules and improves the pot life, inorganic fine substances represented by general fumed silica (silica filler) can be used. However, in general, since light transmission property is required to be ensured, a solid substance having a large particle size is not added to a photo-curable material. Even in the present embodiment, if a solid substance having a large particle size is used, the UV light may be blocked and the UV light may not reach a deep portion. Therefore, an average particle size is preferably equal to or less than 40 nm. On the contrary, if a solid substance having an average particle size smaller than 7 nm is used, the UV light is less blocked and shape retention property is easily expressed, but mixing may become insufficient in a planetary mixer or disper and uniform dispersion may not be possible. Therefore, a thixotropic agent, particularly one having an average particle size of 7 nm or more to 40 nm or less as an inorganic fine particle, is preferable. The average particle size is a median diameter. In a case where a silica filler is used as the thixotropic agent, the filling amount (ratio of the weight of the filled silica filler to the total weight) is preferably equal to or more than 0.1% by mass in order to impart thixotropy. However, if the filling amount is too high, it becomes difficult to apply the adhesive, and thus the filling amount is preferably equal to or less than 20% by mass. As the silica filler, a surface-treated silica filler can also be used. Some surface treatment agents contain low-molecular weight siloxane. Examples of the surface treatment agent having a small amount of low-molecular weight siloxane include polydimethylsiloxane treatment and alkylsilyl treatment. A particularly preferable one is alkylsilyl treatment. As a marketing product, examples of polydimethylsiloxane-treated product include AEROSIL (registered trademark) RY200, RY200L, R202, RY200S, NY50, NY50L, RY50, RY51 (manufactured by Nippon Aerosil Co., Ltd.). Examples of the alkylsilyl treatment include AEROSIL (registered trademark) R805 (manufactured by Nippon Aerosil Co., Ltd.) and the like. Examples of those not treated include AEROSIL (registered trademark) 50, 90, 130, 150, 200, 300 (manufactured by Nippon Aerosil Co., Ltd.) and the like.

(Sensitizer)

The adhesive of the present invention can generate a base by irradiating light having a photosensitive wavelength of a photobase generator, but in order to promote the generation of a base by irradiation in a shorter time, a sensitizer is preferably contained. In particular, for a photobase generator that generates a strong base, a photobase generator using a sensitizer enhances degradability and thus becomes to have high reactivity. Examples of the sensitizer include 2-ethylanthraquinone, 1-chloroanthraquinone, 2-isopropylanthraquinone, and the like. In order to enhance the reactivity, 2-ethylanthraquinone and 1-chloroanthraquinone, which have a high photosensitizing effect and good compatibility with a photobase generator, are more preferable. The content of the sensitizer can be in a range of 1 to 15 parts by mass with respect to 100 parts by mass of the epoxy resin, but is preferably 3 to 10 parts by mass. If the content of the sensitizer is equal to or more than 1 part by mass, improvement in the temporary fixing property is expected. On the other hand, if the content of the sensitizer is equal to or less than 15 parts by mass, a sufficient pot life is expected.

(Other Additives)

The adhesive according to the present invention may be optionally added with diluents or other additives by a commonly used method.

For example, a silane coupling agent can be added for the purpose of improving the adhesiveness. The silane coupling agent is not particularly limited, but is preferably an epoxy compound having the same functional group as that of an epoxy resin or an ether skeleton polythiol (product names are Silquest A-187 and Silquest A-186 (manufactured by Momentive Performance Materials Japan)) or a mercapto compound (product names are KBM-803 and X-12-1156 (manufactured by Shin-Etsu Chemical Co., Ltd.).

(Method for Manufacturing an Adhesive and Use Method)

Subsequently, a method for manufacturing the adhesive of the present invention will be described with an example.

Since the photobase generator and the sensitizer used in the present invention are usually in the form of powder, the photobase generator and the sensitizer are used by being dissolved in other liquid components. The photobase generator and the sensitizer may be dissolved in an epoxy resin or an ether skeleton polythiol curing agent. In addition, the photobase generator and the sensitizer can also be heated to accelerate dissolution.

Figure 2:
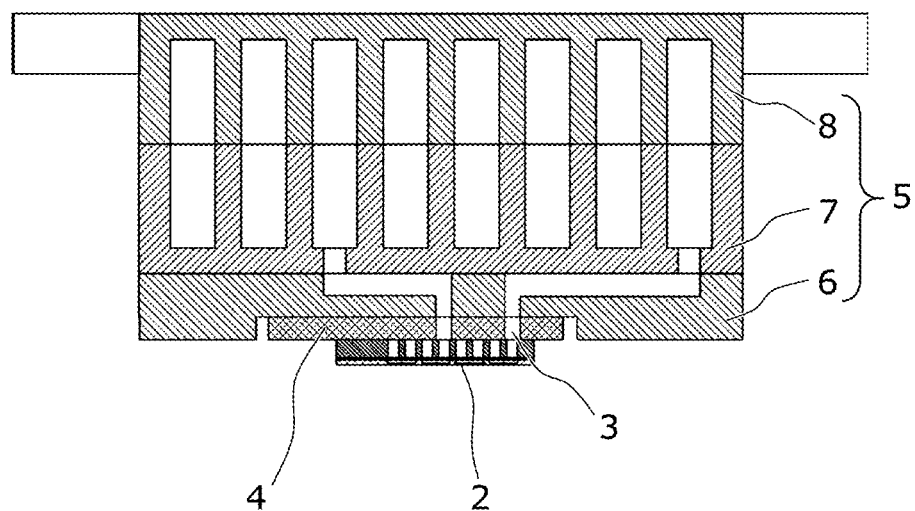
FIG. 2 is a cross-sectional view of an inkjet head.

The adhesive of the present invention can be suitably used as an adhesive for bonding parts of a liquid ejection head such as an inkjet head, which ejects a liquid (ink). FIG. 1 is a perspective view illustrating an aspect of an inkjet head, and FIG. 2 is a schematic cross-sectional view of the inkjet head. An inkjet head 1 includes a recording element substrate 2 which ejects an ink, a support member 4 which supports the recording element substrate and has a supply flow path 3 through which an ink is supplied to the recording element substrate, and a flow path member 5 which supplies an ink to the supply flow path of the ink. The flow path member 5 may include a plurality of parts. For example, the flow path member 5 may include a first flow path member 6, a second flow path member 7, and a third flow path member 8 as illustrated in FIG. 2. In manufacturing steps of an inkjet head, since it is necessary to accurately bond such a plurality of flow path members, a support member, a recording element substrate, and the like, the inkjet head may be assembled by the following procedure. An adhesive is applied onto the support member 4, the recording element substrate 2 is bonded, and the main curing is performed. The third flow path member 8 and the second flow path member 7 are bonded together, and the first flow path member 6 is further bonded to the second flow path member 7 to form the flow path member 5. Subsequently, the support member 4 and the first flow path member 6 of the flow path member 5 are temporarily fixed. Finally, the main curing is performed. That is, the adhesive according to the present invention is contained in at least one joint surface between any two members of the recording element substrate, the support member, and the flow path member.

The adhesive of the present invention has both sufficient pot life and temporary fixing property, and is a basic thiol-curing adhesive, and thus functional groups that contribute to adhesion of hydroxyl groups and the like are relatively not lost by the curing reaction, and the adhesiveness is remarkably high. In addition, since polythiol has an ether skeleton, the adhesive has high ink resistance. Therefore, the adhesiveness is remarkably high even after ink contact, and swelling due to the ink can also be suppressed, and thus the liquid contact property is also good. Therefore, the adhesive can be suitably used for a joint surface between the support member 4 and the first flow path member 6, and can be suitably used as an adhesive for bonding the parts of the inkjet head.

As a method of applying the adhesive, applying means such as a dispenser may be used to apply the adhesive intermittently or continuously. In addition, at the time of curing, the sensitizer irradiates an adhesive-applied surface with light having sensitivity, in particular, ultraviolet light, in advance to generate a base from a photobase generator, subsequently, members are bonded to each other, and when heated to about 100° C., gelation is quickly proceeded and temporary fixing property can be exhibited. In a case where the members to be joined transmit light, the members may be heated by irradiating with light after bonding. Due to the reactivity, by being subjected to a first heat curing which is temporary fixing and a second heat curing which is a main curing that takes longer than the first heat curing in two stages, the adhesive of the present invention becomes particularly suitable for precision bonding. The second heat curing, which is the main curing, naturally takes a longer time than the first heat curing since the adhesive is sufficiently cured. The second heat curing is preferably at a higher temperature than the first heat curing. The curing time and the curing temperature may be appropriately and optimally selected according to the composition of the adhesive.

The support member 4 and the flow path member 5 used are made of ceramics such as alumina or a resin (engineering plastic) having excellent dimensional accuracy such as modified polyphenylene ether Zylon resin ("Zylon" (trademark) L564Z, manufactured by Asahi Kasei Corporation and the like). These materials have sufficient heat resistance against heating of the main curing.

EXAMPLES

Hereinafter, the present invention will be described based on examples, but the present invention is not limited thereto.

Tables 1 and 2 show the composition ratios of Examples and Comparative Examples.

Kneading was carried out in a HIVIS MIX model 3 manufactured by Primix Corporation at a rotary rate of 60 rpm for 5 minutes in a vacuum, and mixing of an epoxy resin as a main agent and a thixotropic agent was carried out for 60 minutes.

Evaluation of each adhesive was carried out for gel time, pot life, adhesiveness before ink contact, adhesiveness after ink contact, and liquid contact property. In the following evaluation, up to C rank is practical, and D rank is not suitable for practical use.

(Temporary Fixing Property: Gel Time)

A 100 μm-thick sample held at 100° C. was irradiated with UV light at an irradiation amount of 12 J/cm2, and evaluated as follows according to the time until the start of gelation.

A: Less than 8 seconds,
B: 8 seconds or more to less than 10 seconds,
C: 10 seconds or more to less than 12 seconds,
D: Equal to or more than 12 seconds.

(Pot Life)

After preparing an adhesive composition, when the composition was left at room temperature, the viscosity of the composition was measured every hour, and the time until the viscosity was doubled was evaluated as follows.

A: Equal to or more than 24 hours,
B: 12 hours or more to less than 24 hours,
D: Less than 12 hours.

(Adhesiveness)

For the adhesiveness before ink contact, an alumina substrate having a thickness of 1 mm and an alumina substrate having a thickness of 3 mm were prepared, and a sample formed by applying a 100 μm-thick adhesive on any of the substrates was prepared. The adhesive was irradiated with UV light at an irradiation amount of 12 J/cm2, both alumina substrates were bonded via the adhesive, cured at 150° C. for 2 hours, and then both alumina substrates were peeled off. The evaluation was performed as follows according to a state at the time of peeling.

A: The alumina substrate is damaged,
B: The adhesive was cohesively failed,
C: Cohesive failure of the adhesive and interfacial peeling between the adhesive and the substrate were present by being mixed,
D: Peeling-off occurred by the interfacial peeling between the adhesive and the substrate.

The adhesiveness after liquid contact was evaluated by immersing the alumina substrate bonded via the adhesive in ink (ink for service head manufactured by Canon) and performing acceleration test at 121° C. for 10 hours. The evaluation result was the same as that of the adhesiveness before ink contact.

(Liquid Contact Property)

The adhesive was immersed in the ink having a mass ratio of 20 times that of the adhesive, an acceleration test was performed at 121° C. for 10 hours, the swelling rate of the cured adhesive was measured, and evaluation was performed as follows.

A: Swelling rate is less than 15%,
B: 15% or more to less than 20%,
D: Equal to or more than 20%.

In Examples 1 to 3, the types of epoxy resins were changed, but all of them sufficiently satisfied the gel time, the pot life, and the adhesiveness. In Examples 4 and 5, the amount of the thixotropic agent was increased or decreased, compared to Example 1, but any difference from Example 1 was not observed. In Example 6, the type of the thixotropic agent was changed, but any difference from Example 1 was observed.

In Examples 7 to 10, the amount of the photobase generator was increased or decreased, compared with Example 1, but when the amount of the photobase generator was decreased, the gel time was delayed, and when the amount of the photobase generator was increased, the pot life was shortened. It is considered that this is because when the amount of the photobase generator is decreased, the reaction of the entire system is slowed down, and when the amount of the photobase generator is increased, the number of bases generated by the decomposition of the photobase generator is increased. It was confirmed that the amount of the photobase generator is preferably 3 to 15 parts by mass with respect to 100 parts by mass of the epoxy resin.

In Example 11, the type of photobase generator was changed, but the gel time was delayed. It is considered that this is due to the difference in sensitivity of the photobase generator.

In Examples 12 to 15, the amount of the sensitizer was increased or decreased, compared with Example 1, but when the amount of the sensitizer was decreased, the gel time was delayed, and when the amount of the sensitizer was increased, the pot life was shortened. It was confirmed that the amount of the sensitizer is preferably 3 to 10 parts by mass with respect to 100 parts by mass of the epoxy resin.

In Examples 16 and 17, the type of sensitizer was changed, but in Example 16, any difference from Example 1 was not observed, whereas in Example 17, the gel time was delayed. It is considered that this is due to the photo-sensitizing effect of the sensitizer or the difference in compatibility with the photobase generator.

In Examples 18 to 22, the amount of ether-type polythiol was increased or decreased, compared with Example 1, but when the amount of ether-type polythiol was decreased, the gel time was slowed down, and when the amount of ether-type polythiol was increased, the liquid contact property was lowered. It is considered that this is because when the amount of ether-type polythiol is decreased, the reaction of the entire system is slowed down, and when the amount of ether-type polythiol is increased, the amount of unreacted polythiol increases. In Example 22, no silane coupling agent was used, but the adhesiveness before and after ink contact was lowered.

In Examples 23 to 28, the type of silane coupling agent was changed from that in Example 1, but the silane coupling agent having an epoxy skeleton and a mercapto skeleton had good adhesiveness, whereas the silane coupling agent having an isocyanate skeleton and a fluorene skeleton had lowered adhesiveness after ink contact. It is considered that this is due to the difference in affinity with epoxy resins or thiol curing agents.

Since in Comparative Example 1, a thixotropic agent was not used, the pot life was deteriorated. It is considered that this is because the motility of the molecule is high due to the lack of thixotropy and the reaction is not suppressed.

In Comparative Example 2, a thixotropic agent was not used, and a photoacid generator was used instead of a photobase generator. Therefore, although the gel time was good, the pot life, the adhesiveness before and after ink contact, and the liquid contact property were deteriorated. It is considered that the deterioration of the pot life is due to the fact that the reaction is not suppressed as described above. In addition, while the photobase generator causes an anionic polymerization reaction, the photoacid generator causes a cationic polymerization reaction, and the functional groups that contribute to adhesiveness of a hydroxyl group and the like are decreased. Therefore, it is considered that the adhesiveness before and after ink contact and the liquid contact property are deteriorated.

In Comparative Examples 3 and 4, since ester-type polythiol was used instead of ether-type polythiol, the gel time was deteriorated. It is considered that this is because the ester-type polythiol has lower reactivity than the ether-type polythiol, and the reaction of the entire system is slowed down.

TABLE 1

| | | | \multicolumn{17}{c}{Examples} |
|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 |
| Epoxy resin (part) | Bisphenol A type | jER828 | 100 | | | 100 | 100 | 100 | 100 | 100 | 100 | 100 | 100 | 100 | 100 | 100 | 100 | 100 | 100 |
| | Bisphenol F type | jER807 | | 100 | | | | | | | | | | | | | | | |
| | Bisphenol novolac type | jER152 | | | 100 | | | | | | | | | | | | | | |
| Photobase generator (part) | | WPBG-300 | 10 | 10 | 10 | 10 | 10 | 10 | 2 | 3 | 15 | 16 | | 10 | 10 | 10 | 10 | 10 | 10 |
| | | WPBG-345 | | | | | | | | | | | 10 | | | | | | |
| Photoacid generator (part) | | SP-170 | | | | | | | | | | | | | | | | | |
| Sensitizer (part) | 2-ethylanthraquinone | | 5 | 5 | 5 | 5 | 5 | 5 | 5 | 5 | 5 | 5 | 5 | 2 | 3 | 10 | 11 | | |
| | 1-chloroanthraquinone | | | | | | | | | | | | | | | | | 5 | |
| | 2-isopropylanthraquinone | | | | | | | | | | | | | | | | | | 5 |
| Polythiol (part) | Ether type | PEPT | 66 | 66 | 66 | 66 | 66 | 66 | 66 | 66 | 66 | 66 | 66 | 66 | 66 | 66 | 66 | 66 | 66 |
| | Ester type | TMMP | | | | | | | | | | | | | | | | | |
| Silane coupling agent (part) | Epoxy | A-187 | 1 | 1 | 1 | 1 | 1 | 1 | 1 | 1 | 1 | 1 | 1 | 1 | 1 | 1 | 1 | 1 | 1 |
| | Alicyclic epoxy | A-186 | | | | | | | | | | | | | | | | | |
| | Mercapto | KBM-803 | | | | | | | | | | | | | | | | | |
| | Polyfunctional mercapto | X-12-1156 | | | | | | | | | | | | | | | | | |
| | Isocyanate | KBE-9007 | | | | | | | | | | | | | | | | | |
| | Polyfunctional isocyanate | X-12-1159L | | | | | | | | | | | | | | | | | |
| | Fluorene skeleton | OCG-157-3 | | | | | | | | | | | | | | | | | |
| Thixotropic agent (part) | | AEROSIL 300 | 10 | 10 | 10 | 5 | 15 | | 10 | 10 | 10 | 10 | 10 | 10 | 10 | 10 | 10 | 10 | 10 |
| | | AEROSIL R805 | | | | | | 10 | | | | | | | | | | | |
| Evaluation | | Gel time 100° C. | A | A | A | A | A | A | B | A | A | A | B | B | A | A | A | A | C |
| | | Pot life | A | A | A | A | A | A | A | A | B | A | A | A | A | B | A | A | A |
| | | Adhesiveness before liquid contact | A | A | A | A | A | A | A | A | A | A | A | A | A | A | A | A | A |
| | | Adhesiveness after liquid contact | A | A | A | A | A | A | A | A | A | A | A | A | A | A | A | A | A |
| | | Liquid contact property | A | A | A | A | A | A | A | A | A | A | A | A | A | A | A | A | A |

TABLE 2

| | | | \multicolumn{11}{c}{Example} | \multicolumn{4}{c}{Comparative Example} |
|---|---|---|---|---|---|---|---|---|---|---|---|---|---|---|---|---|---|
| | | | 18 | 19 | 20 | 21 | 22 | 23 | 24 | 25 | 26 | 27 | 28 | 1 | 2 | 3 | 4 |
| Epoxy resin (part) | Bisphenol A type | jER828 | 100 | 100 | 100 | 100 | 100 | 100 | 100 | 100 | 100 | 100 | 100 | 100 | 100 | 100 | 100 |
| | Bisphoenol F type | jER807 | | | | | | | | | | | | | | | |
| | Phenol novolac type | jER152 | | | | | | | | | | | | | | | |
| Photobase generator (part) | | WPBG-300 | 10 | 10 | 10 | 10 | 10 | 10 | 10 | 10 | 10 | 10 | 10 | 10 | | 10 | 16 |
| | | WPBG-345 | | | | | | | | | | | | | | | |
| Photoacid generator (part) | | SP-170 | | | | | | | | | | | | | 3 | | |
| Sensitizer (part) | 2-ethylanthraquinone | | 5 | 5 | 5 | 5 | 5 | 5 | 5 | 5 | 5 | 5 | 5 | 5 | | 5 | 11 |
| | 1-chloroanthraquinone | | | | | | | | | | | | | | | | |
| | 2-isopropylanthraquinone | | | | | | | | | | | | | | | | |
| Polythiol (part) | Ether type | PEPT | 59 | 60 | 72 | 73 | 66 | 66 | 66 | 66 | 66 | 66 | 66 | 66 | 66 | | |
| | Ester type | TMMP | | | | | | | | | | | | | | 74 | 74 |
| Silane coupling agent (part) | Epoxy | A-187 | 1 | 1 | 1 | 1 | | | | | | | | 1 | 1 | 1 | 1 |
| | Alicyclic epoxy | A-186 | | | | | | 1 | | | | | | | | | |
| | Mercapto | KBM-803 | | | | | | | 1 | | | | | | | | |
| | Polyfunctional mercapto | X-12-1156 | | | | | | | | 1 | | | | | | | |
| | Isocyanate | KBE-9007 | | | | | | | | | 1 | | | | | | |
| | Polyfunctional isocyanate | X-12-1159L | | | | | | | | | | 1 | | | | | |
| | Fluorene skeleton | OCG-157-3 | | | | | | | | | | | 1 | | | | |
| Thixotropic agent (part) | | AEROSIL 300 | 10 | 10 | 10 | 10 | 10 | 10 | 10 | 10 | 10 | 10 | 10 | | | 10 | 10 |
| | | AEROSIL R805 | | | | | | | | | | | | | | | |
| Evaluation | | Gel time 100° C. | C | A | A | A | A | A | A | A | A | A | A | A | A | D | D |
| | | Pot life | A | A | A | A | A | A | A | A | A | A | A | D | D | A | A |
| | | Adhesiveness before liquid contact | A | A | A | C | A | A | A | B | B | B | A | D | A | A | |
| | | Adhesiveness after liquid contact | A | A | A | C | A | A | A | C | C | C | A | D | A | A | |
| | | Liquid contact property | A | A | A | B | A | A | A | A | A | A | A | D | A | A | |

The abbreviations in Tables 1 and 2 are as follows.
jER828: Product name, bisphenol A type epoxy resin (epoxy equivalent: 184 to 194), manufactured by Mitsubishi Chemical Corporation
jER807: Product name, bisphenol F type epoxy resin (epoxy equivalent: 160 to 175), manufactured by Mitsubishi Chemical Corporation
jER152: Product name, phenol novolac type epoxy resin (epoxy equivalent: 172 to 178), manufactured by Mitsubishi Chemical Corporation
WPB G-300: 1,2-dicyclohexyl-4,4,5,5-tetramethylbiguanidium=n-butyltriphenylborate, manufactured by Fujifilm Wako Pure Chemical Industries, Ltd.
WPB G-345: (Z)-{[bis(dimethylamino) methylidene] amino}-N-cyclohexyl (cyclohexylamino) methaneiminium tetrakis(3-fluorophenyl) borate, manufactured by Fujifilm Wako Pure Chemical Industries, Ltd.
2-ethyl anthraquinone: manufactured by Tokyo Kasei Co., Ltd.
1-chloroanthraquinone: manufactured by Tokyo Kasei Co., Ltd.
2-isopropyl anthraquinone: manufactured by Tokyo Kasei Co., Ltd.
SP-170: Product name "ADEKA Optomer SP-170", manufactured by ADEKA Corporation
PEPT: Pentaerythritol tripropanethiol (thiol equivalent: about 115), manufactured by SC Organic Chemical Co., Ltd.
TMMP: Trimethylolpropane tris(3-mercaptopropionate) (thiol equivalent: about 133), manufactured by SC Organic Chemical Co., Ltd.
A-187: Product name "Silquest A-187", manufactured by Momentive Performance Materials Japan
A-186: Product name "Silquest A-186", manufactured by Momentive Performance Materials Japan
KBM-803: Product name, 3-mercaptopropyltrimethoxysilane, manufactured by Shin-Etsu Chemical Co., Ltd.
X-12-1156: Product name, polyfunctional mercapto-based silane coupling agent, manufactured by Shin-Etsu Chemical Co., Ltd.
KBE-9007: Product name, 3-isocyanate propyltriethoxysilane, manufactured by Shin-Etsu Chemical Co., Ltd.
X-12-1159L: Product name, polyfunctional isocyanate-based silane coupling agent, manufactured by Shin-Etsu Chemical Co., Ltd.
OCG-157-3 manufactured by Osaka Gas Chemical Co., Ltd.
AEROSIL 300: Product name "AEROSIL 300", manufactured by Nippon Aerosil
AEROSIL R805: Product name "AEROSIL R805", manufactured by Nippon Aerosil While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-005946, filed Jan. 17, 2020, which is hereby incorporated by reference herein in its entirety.

What is claimed is:

1. An epoxy resin composition comprising:
   an epoxy resin;
   a thixotropic agent;
   a photobase generator; and
   an ether skeleton polythiol,
   wherein the ether skeleton polythiol is at least one compound selected from the group consisting of pentaerythritol tripropanethiol, trimethylolpropane dipropanethiol, and pentaerythritol tetrapropanethiol,
   wherein a content of the ether skeleton polythiol is 60 to 72 parts by mass with respect to 100 parts by mass of the epoxy resin, and wherein the epoxy resin has an epoxy equivalent of 160 to 194 g/eq.

2. The epoxy resin composition according to claim 1, wherein a content of the photobase generator is 3 to 15 parts by mass with respect to 100 parts by mass of the epoxy resin.

3. The epoxy resin composition according to claim 1, further comprising:
   a sensitizer.

4. The epoxy resin composition according to claim 3, wherein a content of the sensitizer is 3 to 10 parts by mass with respect to 100 parts by mass of the epoxy resin.

5. The epoxy resin composition according to claim 3, wherein the sensitizer is 2-ethylanthraquinone or 1-chloroanthraquinone.

6. The epoxy resin composition according to claim 1, further comprising:
   a silane coupling agent.

7. The epoxy resin composition according to claim 6, wherein the silane coupling agent is a compound having an epoxy group or a mercapto group.

8. The epoxy resin composition according to claim 1, wherein the thixotropic agent is a silica filler.

9. A liquid ejection head comprising:
   a recording element substrate which ejects an ink;
   a support member which supports the recording element substrate and has a supply flow path through which an ink is supplied to the recording element substrate; and
   a flow path member which supplies an ink to the supply flow path,
   wherein at least one joint surface between any two members of the recording element substrate, the support member, and the flow path member includes the epoxy resin composition according to claim 1 as an adhesive.

10. The liquid ejection head according to claim 9, wherein in the epoxy resin composition, a content of the photobase generator is 3 to 15 parts by mass with respect to 100 parts by mass of the epoxy resin.

11. The liquid ejection head according to claim 9, wherein the epoxy resin composition further contains a sensitizer.

12. The liquid ejection head according to claim 11, wherein in the epoxy resin composition, a content of the sensitizer is 3 to 10 parts by mass with respect to 100 parts by mass of the epoxy resin.

13. The liquid ejection head according to claim 11, wherein the sensitizer contained in the epoxy resin composition is 2-ethylanthraquinone or 1-chloroanthraquinone.

14. The liquid ejection head according to claim 9, wherein the epoxy resin composition further contains a silane coupling agent.

15. The liquid ejection head according to claim 14, wherein the silane coupling agent contained in the epoxy resin composition is a compound having an epoxy group or a mercapto group.

16. The liquid ejection head according to claim 9, wherein the thixotropic agent contained in the epoxy resin composition is a silica filler.

17. The epoxy resin composition according to claim 1, wherein the epoxy resin has a glycidyl ether skeleton.

* * * * *